(12) United States Patent
Jain et al.

(10) Patent No.: US 11,620,512 B2
(45) Date of Patent: Apr. 4, 2023

(54) DEEP SEGMENT PERSONALIZATION

(71) Applicant: Microsoft Technology Licensing, LLC, Redmond, WA (US)

(72) Inventors: Ashish Jain, San Jose, CA (US); Smriti R. Ramakrishnan, Belmont, CA (US); Parag Agrawal, Sunnyvale, CA (US); Aastha Jain, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 490 days.

(21) Appl. No.: 16/588,885

(22) Filed: Sep. 30, 2019

(65) Prior Publication Data

US 2021/0097384 A1   Apr. 1, 2021

(51) Int. Cl.
| | |
|---|---|
| *G06N 3/08* | (2006.01) |
| *G06N 3/04* | (2006.01) |
| *G06N 20/00* | (2019.01) |
| *G06F 16/248* | (2019.01) |

(52) U.S. Cl.
CPC ............ *G06N 3/08* (2013.01); *G06F 16/248* (2019.01); *G06N 3/04* (2013.01); *G06N 20/00* (2019.01)

(58) Field of Classification Search
CPC .................................................. G06N 3/0454
See application file for complete search history.

(56) References Cited

U.S. PATENT DOCUMENTS

| | | | | |
|---|---|---|---|---|
| 2017/0262770 A1* | 9/2017 | Purdy | .................... | B60W 40/09 |
| 2017/0300824 A1* | 10/2017 | Peng | .................... | G06F 11/3409 |
| 2018/0336490 A1* | 11/2018 | Gao | ........................ | G06N 7/005 |
| 2020/0327455 A1* | 10/2020 | Baker | ................... | G06F 16/285 |
| 2021/0056458 A1* | 2/2021 | Savova | ..................... | G06N 5/02 |
| 2021/0216560 A1* | 7/2021 | Power | ................. | G06F 16/2272 |

OTHER PUBLICATIONS

Zhang, X., Zhou, Y., Ma, Y., Chen, B.C., Zhang, L. and Agarwal, D., 2016, August. Glmix: Generalized linear mixed models for large-scale response prediction. In Proceedings of the 22nd ACM SIGKDD international conference on knowledge discovery and data mining (pp. 363-372). (Year: 2016).*

Deng, Y., Lei, H., Li, X. and Lin, Y., May 2018. An improved deep neural network model for job matching. In 2018 International Conference on Artificial Intelligence and Big Data (ICAIBD) (pp. 106-112). IEEE. (Year: 2018).*

* cited by examiner

*Primary Examiner* — Daniel T Pellett
(74) *Attorney, Agent, or Firm* — Nicholson De Vos Webster & Elliott LLP (57) ABSTRACT

Techniques for using machine learning to leverage deep segment embeddings are provided. In one technique, a set of training data is processed using one or more machine learning techniques to train a neural network and learn an embedding for each segment of multiple segments. In response to receiving a request, multiple elements are identified, such as a source entity that is associated with the request, a source embedding for the source entity, a particular segment with which the source entity is associated, a segment embedding for the particular segment, and multiple target entities. For each target entity, a target embedding is identified and the target embedding, the source embedding, and the segment embedding are input into the neural network to generate output that is associated with the target entity. Based on the output, data about a subset of the target entities is presented on a computing device.

20 Claims, 5 Drawing Sheets

DEEP SEGMENT PERSONALIZATION

TECHNICAL FIELD

The present disclosure relates to machine learning and, more particularly, to generating a prediction model based on learned latent representations for attributes of entities and content items. SUGGESTED CLASSIFICATION: 706/025; SUGGESTED ART UNIT: 2122.

BACKGROUND

The Internet allows end-users operating computing devices to request content from many different publishers. Some publishers desire to send additional content items to users who visit their respective websites or who otherwise interact with the publishers. To do so, publishers may rely on a content delivery service that delivers the additional content items over one or more computer networks to computing devices of such users. Some content delivery services have a large database of content items from which to select. It is difficult for a content provider to intelligently select which of many content items should be delivered in response to each request from a publisher or a computing device of a user.

For example, in response to a user visiting a website, a set of recommendations is presented to the user, each recommendation corresponding to a different user to which the user might want to connect, in order to expand the user's online network. The set of recommendations is generated using one or more machine learned models that are trained based on certain features. However, the set of recommendations lack personalization in terms of fine-grained segments, such as alumni that share the same geography. Also, current models fail to capture non-linear interactions among various member features and non-linear segment personalization or learned segments.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for using machine learning techniques to predict entity interaction with content items are provided. A goal is to personalize content items (e.g., recommendations) based on a function of segments. Example entity interactions include a click of a content item, a like or share of a button associated with a content item, or a viewing of a video.

In one technique, non-linearity among segments is inferred in the same equation as ranking. The joint training setup learns the best (e.g., non-linear) segment representation on which to personalize and then uses such representations to adjust the ranking of recommendations.

In a related technique, a new neural network architecture that is built to identify content items for presentation to a user is optimized for online scoring efficiency to address high-batch, high-QPS use cases.

For each candidate content item that is identified in response to a content request, an embedding of a source entity (e.g., a user) that will be presented a set of content items is input to a first branch of a trained neural network to generate a first output embedding for the source entity. Similarly, an embedding of a target entity that corresponds to the candidate content item is input to a second branch of the trained neural network to generate a second output embedding for the target entity. Also, one or more embeddings for one or more segments to which the source entity is associated are input to a third branch of the trained neural network to generate a third output embedding for the one or more segments. The output embeddings are used to determine which content item(s) to select for presentation to the source entity.

This approach to automatically learning embeddings (or latent representations) of segments and leveraging those embeddings at serving time improves the accuracy of predicted entity interaction rates, resulting in identifying more relevant content items for presentation to requesting entities. Another benefit of learning segment embeddings (apart from learning non-linearity) is that learning such embeddings allows the model to generalize to previously unseen segment combinations in the data. Prior approaches failed to capture non-linear interactions among entity features and segments.

System Overview

Figure 1:
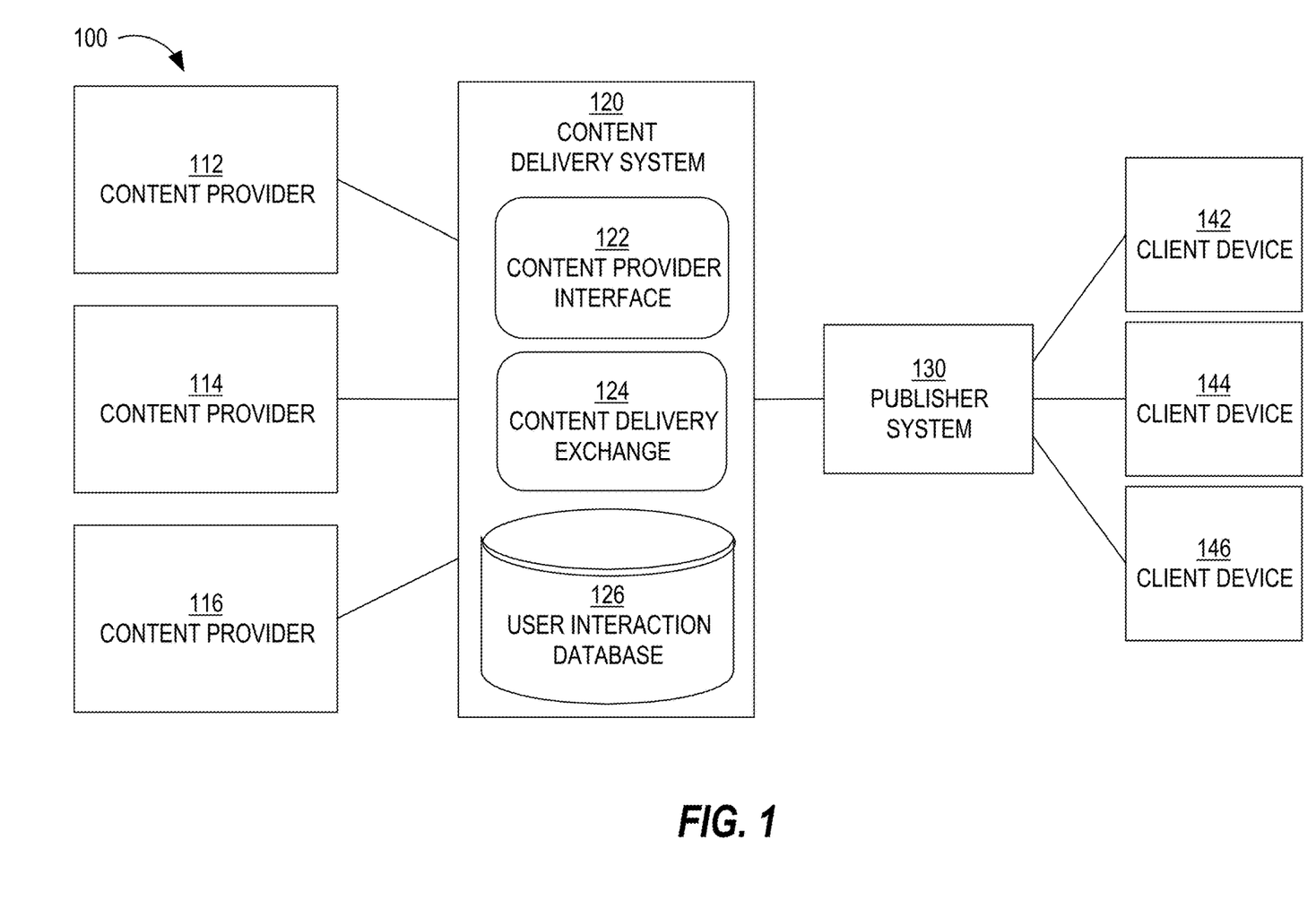
FIG. 1 is a block diagram that depicts an example system for distributing content items to one or more end-users, in an embodiment.

FIG. 1 is a block diagram that depicts a system 100 for distributing content items to one or more end-users, in an embodiment. System 100 includes content providers 112-116, a content delivery system 120, a publisher system 130, and client devices 142-146. Although three content providers are depicted, system 100 may include more or less content providers. For example, in another embodiment, system 100 does not include any content providers. Instead, there are only two main types of entities: end users that operate client devices 142-146 and an entity that operates content delivery system 120 and publisher system 130. Additionally, system 100 may include more than one publisher and more or less client devices.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to create and manage their respective content delivery campaigns and (2) a content delivery exchange 124 that conducts content item selection events in response to content requests from a third-party content delivery exchange and/or from publisher systems, such as publisher system 130.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders includes one or more calls (or HTTP requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 124, and that bids for space (on one or more publisher systems, such as publisher system 130) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus, DoubleClick, and LinkedIn. Because bidders act on behalf of content providers (e.g., advertisers), bidders create content delivery campaigns and, thus, specify user targeting criteria, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

As noted above, in one embodiment, system 100 does not include any content providers. Thus, no content delivery campaigns are supported, as least from an external party relative to content delivery system 120. However, the party or entity that owns and manages content delivery system 120 may support "internal" content delivery campaigns that (1) are created by representatives employed by that party or entity and (2) act similarly to content delivery campaigns disclosed herein. Such internal campaigns may or may not have associated resource reduction amounts (or "bids").

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users. (In most content delivery systems, targeting criteria cannot be so granular as to target individual users or members of an online service.) Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per impression or CPM). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Content delivery system 120 may manage only campaigns that are of the same type of charging model or may manage campaigns that are of any combination of the three types of charging models.

A content delivery campaign may be associated with a resource budget that indicates how much the corresponding content provider is willing to be charged by content delivery system 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., whether from different content delivery campaigns or not from any content delivery campaign) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 124 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

In the scenario where there is no content delivery campaign, then a content item selection event involves identifying a set of candidate content items (each of which is potentially relevant) and scoring such candidates. The manner in which a set of candidate content items is identified may vary depending on the context. For example, if the content items to present to a source entity correspond to users or other members (of an online network) with whom the source entity is not currently connected, then information about the source entity may be used to identify multiple users, such as users who work (or have worked) at the same company at which the source entity currently works or previously worked, users who work at a company that employs multiple friends or connections of the source entity, users who attended the same university as the source entity, etc. Such users or target entities may be identified as satisfying one or more pre-defined criteria, such as a "same company," "same university," or "same company as friends." Additional criteria may be used in the certain for identifying the initial set of candidate content items.

A final set of candidate content delivery campaigns is ranked based on one or more criteria, such as predicted click-through rat e (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery system 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR (or pCTR) of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 124 conducts one or more content item selection events. Thus, content delivery exchange 124 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In this embodiment, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

Event Logging

Content delivery system 120 may log one or more types of events, with respect to content item summaries, across client devices 152-156 (and other client devices not depicted). For example, content delivery system 120 determines whether a content item that content delivery exchange 124 delivers is presented at (e.g., displayed by or played back at) a client device. Such an "event" is referred to as an "impression." As another example, content delivery system 120 determines whether a content item that exchange 124 delivers is selected by a user of a client device. Such a "user interaction" is referred to as a "click." Content delivery system 120 stores such data as user interaction data, such as an impression data set and/or a click data set. Thus, content delivery system 120 may include a user interaction database

128. Logging such events allows content delivery system 120 to track how well different content items and/or campaigns perform.

For example, content delivery system 120 receives impression data items, each of which is associated with a different instance of an impression and a particular content item. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if content delivery system 120 manages delivery of multiple content items, then different impression data items may be associated with different content items. One or more of these individual data items may be encrypted to protect privacy of the end-user.

Similarly, a click data item may indicate a particular content item, a date of the user selection, a time of the user selection, a particular publisher or source (e.g., onsite v. offsite), a particular client device that displayed the specific content item, and/or a user identifier of a user that operates the particular client device. If impression data items are generated and processed properly, a click data item should be associated with an impression data item that corresponds to the click data item. From click data items and impression data items associated with a content item, content delivery system 120 may calculate a CTR for the content item.

Embeddings

An embedding is a vector of real numbers. "Embedding" is a name for a set of feature learning techniques where words or identifiers are mapped to vectors of real numbers. Conceptually, embedding involves a mathematical embedding from a space with one dimension per word/phrase (or identifier) to a continuous vector space.

One method to generate embeddings includes artificial neural networks. In the context of linguistics, word embedding, when used as the underlying input representation, have been shown to boost performance in natural language processing (NLP) tasks, such as syntactic parsing and sentiment analysis. Word embedding aims to quantify and categorize semantic similarities between linguistic items based on their distributional properties in large samples of language data. The underlying idea that a word is characterized by "the company it keeps."

In an embodiment, in the context of content item selection, an embedding is learned for each of multiple source entities, multiple target entities, and multiple segments. A source entity may correspond to a user, while a target entity may correspond to a user, an organization, a topic, a document, an image, or a piece of content. Values representing a source entity, a target entity, or a segment may be string values, numeric identifiers, or integers. For example, a target entity corresponds to a company and a value of the target entity may be a name (e.g., string of non-numeric characters) of the company (e.g., "Company X") or an identifier (e.g., "435256") that uniquely identifies the company.

In a related embodiment, embeddings for source entities and target entities are learned through a separate process and not based on training data that is used to train the neural network. For example, an embedding for each entity in a graph of connected entities is learned using an unsupervised machine learning technique, such as clustering. In such a technique, an embedding for a particular entity is generated/learned based on embeddings for entities to which the particular entity is connected in the graph. The graph may represent an online social network graph of users and their respective attributes. Example attributes of a user include job title, job industry, job function, skills, current employer, past employers, academic institutions attended, academic degrees earned, and other users to which the user is connected in the online social network graph. A connection may be created for a pair of users based on both users providing input confirming that they want to be connected in the online social network graph.

Each embedding represents something different. For example, an embedding for a source entity represents attributes of the source entity and/or attributes of entities to which the source entity is connected. Similarly, an embedding for a target entity represents attributes of the target entity and/or attributes of entities to which the target entity is connected. Alternatively, if a target entity is a content item, then an embedding for the target entity may represent online behavior (e.g., likes, shares, comments, clicks, sign-ups, purchases) of users with respect to the content item. As another example, an embedding for a segment represents attributes of users and/or online behavior of users that belong to that segment.

Neural Network Architecture

Figure 2:
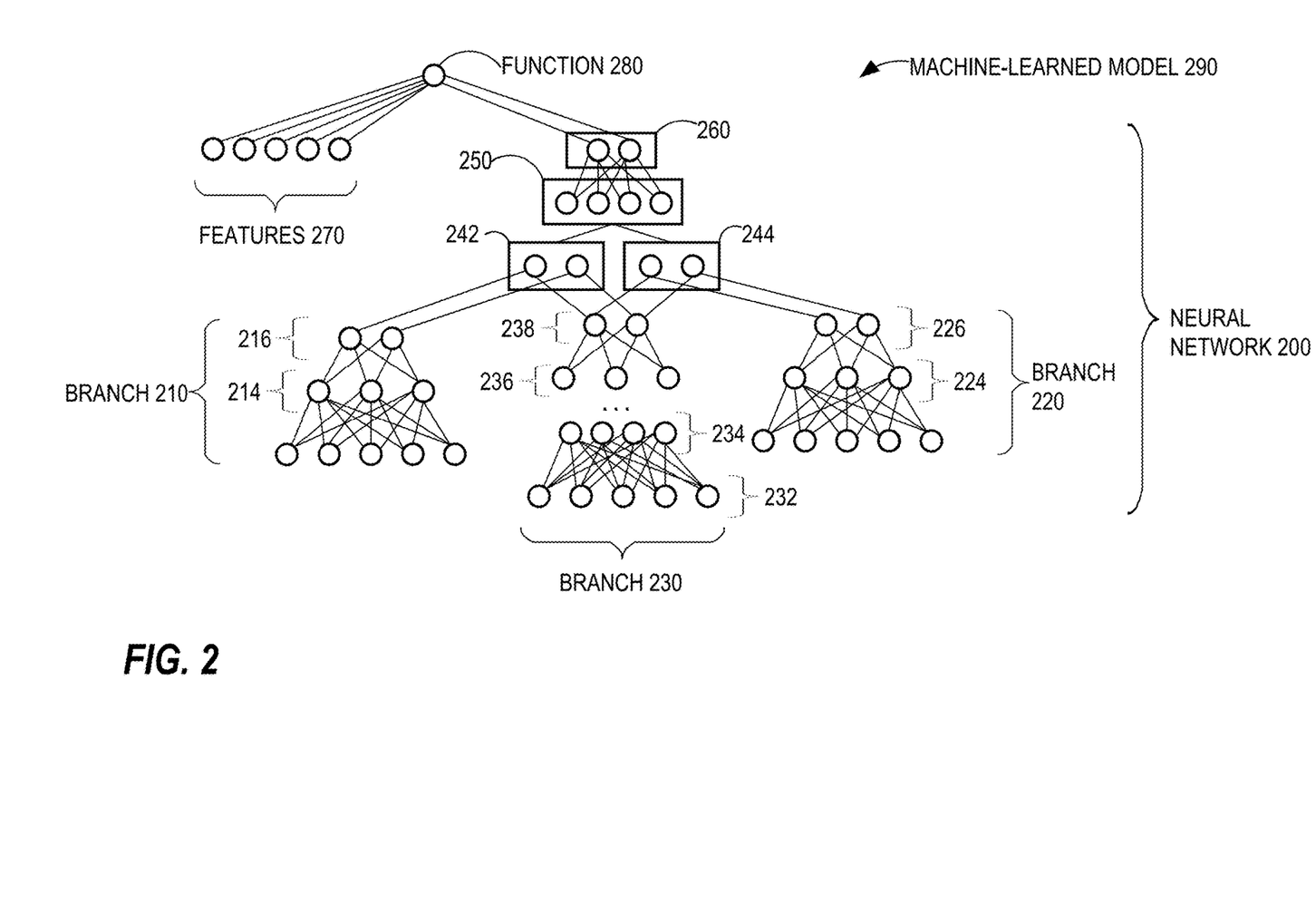
FIG. 2 is a block diagram that depicts an example neural network that is part of a larger model, in an embodiment.

FIG. 2 is a block diagram that depicts an example neural network 200 that is part of a larger machine-learned model 290, in an embodiment. Neural network 200 includes multiple connected branches 210-230 and layers 242-260.

Branch 210 corresponds to source entities, branch 220 corresponds to target entities, and branch 230 corresponds to segments. Each of branches 210-230 comprises multiple layers, such an input layer, one or more hidden layers, and an output layer. Different branches may include different numbers of hidden layers. For example, branches 210 and 220 include one hidden layer each (hidden layers 214 and 224, respectively), while branch 230 includes multiple hidden layers 234-236.

Each layer comprises one or more neurons (or nodes). Different layers may include different numbers of neurons. The output of each neuron is computed by a (e.g., non-linear) function of the sum of its inputs. The connections between neurons are referred to as "edges." Neurons and edges may have a weight that adjusts as learning proceeds. The weight increases or decreases the strength of the signal at a connection. Neurons may have a threshold such that a signal is sent only if the aggregate signal crosses that threshold.

In an embodiment, the input layers of branches 210-220 accept embeddings that were learned through an unsupervised process while input layer 232 of branch 230 accepts segment encodings (e.g., one-hot encodings corresponding to segments). Alternatively, input layer 232 of branch 230 may accept embeddings that were learned through an unsupervised process, similar to source/target entity embeddings.) Also, the weights associated with each edge in neural network 200 may be learned through the same supervised process.

Some neural networks are fully connected from their respective input layer through one or more hidden layers and finally to their respective output layer. A fully connected neural network is one where each neuron (or node) in each "upstream" layer is connected to each neuron in the subsequent layer. However, neural network 200 is not fully connected. Instead, neural network 200 includes branches 210-230. For example, none of the neurons in branch 210 is connected to any neuron in branches 220-230. As another example, none of the neurons in branch 220 is connected to any neuron in branches 210 and 230.

However, output layer 216 of branch 210 is connected to a subsequent entity-segment connecting layer 242 to which output layer 238 of branch 230 is also connected. Similarly, output layer 226 of branch 220 is connected to a subsequent entity-segment connecting layer 244 to which output layer 238 of branch 230 is also connected.

Entity-segment connecting layers 242 and 244 are both connected to a unifying layer 250. Each box signifies that the corresponding interactions or layers are scored online (i.e., in real-time). The unboxed elements of neural network 200 (e.g., branches 210-230) are scored offline. Different layers may be associated with certain functions. For example, unifying layer 250 may be a Hadamard product, which is a binary operation that takes two matrices of the same dimensions as input and produces (or outputs) another matrix of the same dimension, where each element i in the output matrix is the product of the corresponding elements i of two input matrices.

The unifying layer 250 may be the final output layer of neural network 200; however, in the depicted example, there is at least one more layer, final output layer 260, to which unifying layer 250 is connected. Although two neurons are depicted as output from neural network 200 (which is the output of final output layer 260), the output may be one neuron or more neurons.

The output of final output layer 260 may be directly used to score a target entity relative to a source entity and one or more segments to which the source entity belongs. However, in the depicted example, the output from final output layer 260 is one of multiple inputs to a machine-learned model 290, such as a linear regression or a logistic regression model. For example, some of features 270 of machine-learned model 290 may pertain to attributes of the source entity, attributes pertaining to the target entity, and/or one or more pair features pertaining to both the source entity and the target entity, such as whether certain attributes are shared by both the source entity and the target entity.

Some of features 270 may be non-learned segments (e.g., pre-defined segments, such as geographic location). Additionally or alternatively, some of features 270 may be non-learned interactions between an entity feature and a segment (e.g., using manually crafted cross features.) The described architecture does not preclude using non-learned segments or non-learned interactions along with learned segments and learned interactions.

Feature values for features 270 are input into machine-learned model 290 (in addition to the output of final output layer 260) to generate output from function 280. The output may reflect a probability or likelihood of the source entity performing a particular action or may reflect an unbounded number, depending on the target or dependent variable upon which machine-learned model 290 is trained.

Contextual Features in Deep and Wide Model

If embeddings for segments and weights for different connections between neurons are learned without taking into account contextual features, then the embeddings and weights are not learned properly and will be biased.

In an embodiment, a score for a candidate pair of entities takes into account features other than the source entity embeddings, the target entity embeddings, and the segment embeddings. Examples of such other features are contextual features, such as time (e.g., a binarized feature set indicating time of the week), device type (e.g., Android, iOS), channel (e.g., mobile, desktop, tablet), channel.time (interaction of channel and time), channel.position (interaction of channel and position of the content item), user.bucket (bucketed user segment feature based on demographics), time.user.bucket (interaction of user segment and time bucket), company.feature.company_size (a bucketed binary feature for the size of the company of the content item), company.feature.company_follower (a hot encoding for bucketed feature indicating a number of followers a company has), company.feature.company_industry (a hot encoding for industry of the company to which the user belongs). One or more of these features may be represented as a multinomial one-hot encoded feature. For example, all discrete valued features are one-hot encoded, meaning that each feature value is associated with a vector and the index of a vector corresponding to the desired value is '1' and the others are '0.' The weights or coefficients for the contextual features are learned while the segment embeddings and the weights for the neural network (e.g., neural network 200) are learned. Such additional features cause the "deep model" (or neural network 200 of FIG. 2) to also be a wide model.

Function 280 may be a logistic regression, such as a sigmoid function $\sigma(W_1*X+W_2*\theta)$ where $\theta=\{e_m, e_t, e_s\}$, $e_m$ is a source entity embedding for entity m, $e_t$ is a target entity embedding for a candidate content item t, $e_s$ is a segment embedding, X is a set of contextual feature values, $W_1$ is a set of machine-learned weights for the contextual features, and $W_2$ is a set of machine-learned weights for the three embeddings.

In learning the weights (e.g., $W_1$, $W_2$, and weights for different edges in the neural networks), initial values for the weights may be randomly selected. In this example, logistic regression is used to learn the weights. Logistic regression may also be used to learn weights for edges in neural network 200. Alternatives to logistic regression include Decision Trees, Naive Bayes, and support vector machines (SVMs).

An advantage of learning segment embeddings separate from the weights of the contextual features is that the segment embeddings are not biased with the contextual features. Another advantage is that the segment embeddings generated by this model may be used as input to other models (as features). Another advantage of learning segment embeddings separate from the contextual features is that, in a previous prediction model that relied on identifier-related features (such as member identifier and content item identifier), such identifier-related features are very sparse and the number of identifier features is much larger than the number of global features, such as industry, job title, employer name, etc. Because embodiments do not rely on such a multitude of identifier-related features, the training of the prediction model takes much less time.

Segment

Example segment categories include geography, language, range of connection counts, and online activity level. Thus, each source entity may belong to a particular geography segment (corresponding to a geography in which the source entity is located or resides or works), one or more language segments (corresponding to languages spoken by the source entity), a particular connection count range segment (corresponding to a range of connection counts that includes a connection count of the source entity), and/or a particular online activity level segment (corresponding to a level of online activity exhibited by the source entity).

Each segment category includes multiple pre-defined segments. For example, within the geography segment category, there may be eight possible geography segments: U.S., China, South America, Western Europe, Eastern Europe, Russia, India, and Japan. As another example, within the connection count segment category, there may be three possible connection count segments: less than or equal to 30, greater than 30 and less than or equal to 99, and greater than 99. As another example, within the online activity level segment category, there may be four different online activity level segments: daily visitor (e.g., average of three or more visits per week), weekly visitor (e.g., average of less than three visits per week but more than three visits per month), monthly visitor (e.g., less than three visits per month but more than one visit every two months), and rare visitor (e.g., less than one visit every two months).

Training the Machine-Learned Model

The training data that is used to generate or "learn" embeddings for different segments includes (or is based on) a portion of the user interaction data described previously. In order to generate the training data, the original user interaction data may have been augmented with additional information and/or may have been filtered to remove unnecessary data, such as timestamp data. For example, given a click data item that includes a user/member identifier, the user identifier is used to look up, in a profile database, a profile and retrieve one or more data items from the profile, such as one or more most recent job titles, one or more skills, and an industry.

One or more of the data items from the profile may indicate one or more user segments, such as a particular geography, a particular language, a particular connection count range, and/or a particular online activity level. Some of the data items (e.g., geographic location or language) may be used as segment identifiers. Other data items may be translated to a particular segment through one or more mappings. For example, if a user has 29 connections, then the user is associated with the less-than-or-equal-to-30 segment. As another example, if the user has visited publisher system 130 four times in the last week, then the user is associated with the daily visitor segment.

If the neural network is the deep portion of a deep and wide model, as in the embodiment depicted in FIG. 2, then if the retrieved attribute values are names and not identifiers, then each retrieved attribute value name may be used to lookup, in a mapping (e.g., "'Java Skill'→87654"), a unique internal identifier that is mapped to the retrieved attribute value name. As another example, given an impression data item that includes a content item identifier, the content item identifier is used to look up, in a content item database, a record that includes an embedding for the corresponding content item.

Thus, each training instance may include multiple source entity-related attribute values, multiple content item-related attribute values, a source entity embedding, a target entity embedding that corresponds to a content item, one or more segment values, and a label that indicates a target or dependent variable. Training instance may also include "pair-features," or features that are related to both the source entity and the target entity. Example of such features include the number of common connections between source entity and target entity (where both are members of an online social network) and whether the source entity and the target entity attended the same school.

The target variable may be a 0 or 1, indicating whether the source entity performed a particular action when presented with the content item that corresponds to the target entity. Alternatively, the target variable may be a non-binary value, such as real number that indicates one or multiple types of user interactions or, for example, a time duration indicating how long a user viewed the content item. The target variable may represent any user action that the entity operating content delivery system 120 desires to optimize.

In the embodiment neural network 200 is part of a deep and wide model, content item-related attribute values may include a content item identifier that uniquely identifies a content item, a content delivery campaign identifier that uniquely identifies a content delivery campaign to which the content item belongs, a content provider identifier that uniquely identifies a content provider that initiated or created the content delivery campaign.

Similarly, user-related attribute values include: a user identifier that uniquely identifies a user (e.g., a member of a social network), one or more employer identifiers, each of which uniquely identifies an employer that the user may have specified in his/her profile; one or more job title identifiers, each of which uniquely identifies a job title that the user may have specified in his/her profile; one or more skill identifiers, each of which uniquely identifies a skill that the user may have specified in his/her profile; and an industry identifier that uniquely identifies an industry that the user may have specified in his/her profile or that may have been derived based on a job title (and/or other information) associated with the user.

Each training instance also indicates whether the indicated content item was selected or otherwise interacted with by the source entity. In practice, very few content items are selected by a user, such as under 0.4%. One way to deal with imbalanced labels is to downsample the negative samples. A more effective way to deal with imbalanced labels may be to upsample the positive samples. Additionally or alternatively, positive samples may be weighted more than negative samples through weighted regularization, weighted costs functions, or other approaches.

The user interaction data upon which the training data is based may be limited to user interaction data that was generated during a certain time period, such as the last fourteen days.

In training multiple artificial neural networks, embeddings for attribute values, such as particular segments, that are indicated in the training data may be initialized to random numbers at the beginning. During the training process, each embedding is continuously modified until the embedding "stabilizes", such that the object value that is being optimized stops significantly improving. Training may be performed in small batches and embeddings may be updated after each batch. A stabilized embedding becomes a "final" embedding for the corresponding attribute value. A final embedding and its corresponding attribute value may be stored in a mapping or table of multiple final embeddings. For example, one table may store associations between final embeddings and attribute values pertaining to segments from a first category (e.g., geography) and another table may store associations between final embeddings and attribute values pertaining to segments from a second category (e.g., language).

The training process involves gradient descent and backpropagation. Gradient descent is an iterative optimization algorithm for finding the minimum of a function; in this case, a loss function. Backpropagation is a method used in artificial neural networks to calculate the error contribution of each neuron after a batch of data is processed. In the context of learning, backpropagation is used by a gradient descent optimization algorithm to adjust the weight of neurons (or nodes) in an artificial neural network by calculating the gradient of the loss function. Backpropagation is also referred to as the "backward propagation of errors" because the error is calculated at the output and distributed back through the neural network layers ultimately arriving at the input layer. For models involving embeddings, there is an implicit input layer that is often not mentioned. The embeddings are actually a layer by themselves and backpropagation goes all the way back to the embedding layer, unless the embedding layer is already determined using a separate process (e.g., an unsupervised process) as described herein. Backpropagation begins at the final (output) layer that generates the probabilities and is applied per batch. Batch size depends on several factors, including the available memory on the computing device or GPU.

An input corresponding to a particular segment (e.g., language) is a one-hot encoding that comprises all zeros except for a single one value representing the attribute value. For example, if there are three ranges of connection counts, then each one-hot encoding for the connection count segment is three values in length. For example, if the connection count ranges are <30, >29 & <100, and >99, then a one-hot encoding for <30 connection count may be {1, 0, 0}, a hot encoding for >29 & <100 connection count may be {0, 1, 0}, and a one-hot encoding for >99 connection count may be {0, 0, 1}. For any other type of attribute that is associated with an embedding, such as skills, if there are one thousand possible skills, then a one-hot encoding for each skill is a thousand entries in length.

Figure 3:
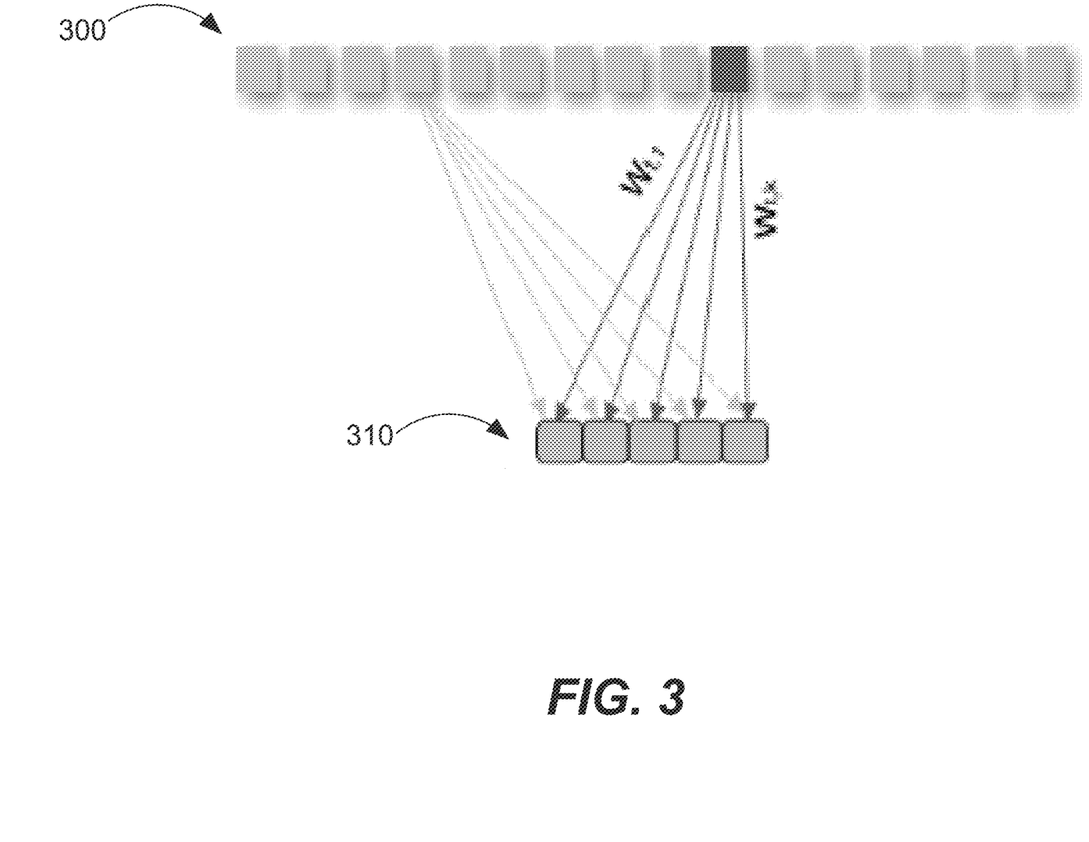
FIG. 3 is a diagram that depicts an example hot encoding, in an embodiment.

FIG. 3 is a diagram that depicts an example one-hot encoding 300, in an embodiment. One-hot encoding 300 includes sixteen entries, one for each of sixteen possible values, such as industries. One-hot encoding 300 includes a 1 for only one entry and a 0 for the remaining entries. Thus, for example, each language is associated with a different one-hot encoding. Each index to a '1' entry of a one-hot encoding is associated with five weights, which are initialized to (e.g., random) values and learned using one or more machine learning techniques, such as backpropagation. Thus, each language is associated with a different set of five weights. The five weights learned for a particular language become the embedding 310 of that language.

After generating embeddings for different values of different attributes (e.g., segments) during the training process, the embeddings may be associated with their respective attribute (e.g., segment) values. For example, an embedding for a first segment is stored in association with the first segment (such as a unique segment identifier). Similarly, an embedding for a second segment is stored in association with that particular segment. Additionally or alternatively, in response to identifying a source entity's segments, multiple one-hot encoded segment categories are concatenated. For example, if there are three segment categories (geo, activity level, and connection group), then the following three segment encodings are input to the neural network (e.g., branch 230): [one-hot encoded geo, one-hot encoded activity level, one-hot encoded connection group].

In an embodiment, machine-learned model 290, which includes a deep portion (neural network 200) and a wide portion (features 270 and function 280; for example, a logistic layer) are jointly learned and not learned separately. Later, when a content request is received that is initiated by a particular user, (1) an embedding for the particular user, (2) embeddings of one or more attribute (e.g., segment) values of the particular user are retrieved, and (3) embeddings of one or more content items that are candidates for presentation to the particular user are identified. For example, a content request may include a user/member identifier that is used to lookup a profile of the particular user in a profile database. As part of the lookup, certain attribute names are used in the lookup, such as "Geography," "Language," "Connection Count," and "Online Activity Level." The corresponding attribute values are retrieved from the profile. One or more mappings of attribute values to their respective embeddings are accessed to determine the embeddings of the retrieved attribute values. As noted previously, there may be a separate mapping or table for each attribute or segment category.

On the content item side, a content request initiates a content item selection event where multiple content items (whether or not from different content delivery campaigns) are identified as candidate content items for presentation to a user. For each candidate content item, attribute values of the candidate content item are identified. Such attribute values may be used as feature values in the wide portion of the deep and wide model.

For each candidate content item, a target entity embedding corresponding to the candidate content item, the source entity embedding, and one or more segment embeddings are input to neural network 200 to generate output that is used to generate a score for the candidate content item. Thus, a different output is generated for each candidate content item. For example, (1) the source entity embedding and the one or more segment embeddings are input to entity-segment connecting layer 242 while (2) the one or more segment embeddings and the target entity embedding are input to entity-segment connecting layer 244. The outputs of those respective layers are input to unifying layer 250, whose output is input to final output layer 260. The output of final output layer 260 (for one candidate content item) is input to (e.g., logistic) function 280. The outputs corresponding to all candidate content items are used to select a subset of the candidate content items. For example, the greater the value of an output from final output layer 260 (all else being equal), the greater the probability of the source entity selecting the corresponding content item. As depicted in FIG. 2, the value of each output from final output layer 260 is one of multiple features that are considered in selecting a subset of the candidate content items.

Target Entity Segments

The examples provided herein regarding segments pertain to segments to which the source entity belongs or is associated with. In a related embodiment, a target entity belongs to or is associated with one or more segments. For example, if the target entity is a user, then the target entity may be associated with a geographic location/region and may be assigned to a particular connection count group. Segment embeddings for target entities may be learned in the same as segment embeddings for source entities.

A target entity may be an entity that is not a person. Thus, "segment" is a categorical attribute that describes an item and takes on a fixed set of values. For example, if a target entity is a post on a feed, then a segment category may be the media type in the post, where example segments include video only, text with video, and text only. Another example segment category for a post on a feed is type of content, such as job posting, sponsored advertisement, and original/organic post. If the target entity is a shopping recommendation, then a segment category might be the category of the item of the recommendation, such as electronics, home & kitchen, food, and gardening.

Scoring Process Overview

Figure 4:
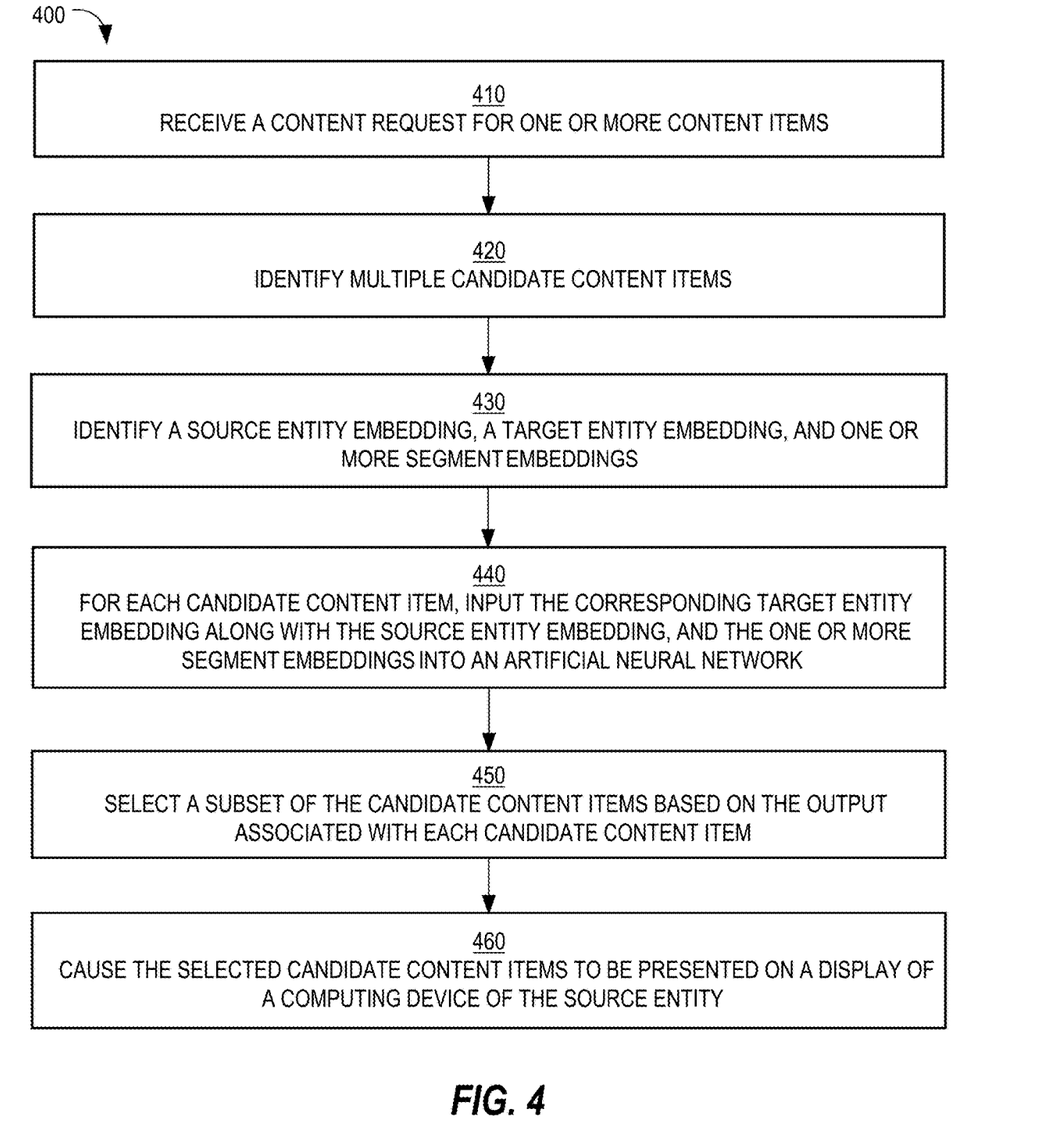
FIG. 4 is a flow diagram that depicts an example process for leveraging a machine-learned model to select content items for presenting on computing devices, in an embodiment.

FIG. 4 is a flow diagram that depicts a process 400 for leveraging a machine-learned model to select content items for presenting on computing devices, in an embodiment. Process 400 may be implemented by content delivery exchange 124.

At block 410, a content request for one or more content items is received. The content request is initiated by a computing device (e.g., client device 142) that is operated by a source entity or user. The content request may have been generated and transmitted when the computing device loaded a web page that includes code for generating the content request. The web page may be provided by a server that is in the same domain or network as content delivery exchange 124.

At block 420, multiple candidate content items are identified. Some content items may be associated with targeting criteria and, in order to be identified in block 420, the targeting criteria of a content item should be satisfied (at least partially). Some content items may not be associated with any targeting criteria. Instead, such content items are identified based on other criteria, such as the corresponding target entity (of a content item) having worked at the same company, having attended the same school, having multiple common connections, and having interacted with (e.g., liked/commented/shared) the same content, or the source entity having shown interest in the same topic(s) pertaining to the content item.

At block 430, multiple embeddings (and, optionally, one or more encodings) are identified, including: (1) a source entity embedding associated with the source entity that is associated with (e.g., triggered) the content request; (2) a segment encoding (or, as an optimization described in more detail below, a segment embedding) corresponding to one or more segments to which the source entity belongs; and (3) a target embedding for each candidate content item. Block 430 may involve identifying, for each of one or more segment categories, a one-hot encoding and, in the scenario with multiple segments and, hence, multiple identified one-hot encodings, concatenating the one-hot encodings to produce the segment encoding. For example, if there are four segment categories and nine segments within each segment category, then a segment encoding would comprise 36 bits and four of those bits would be set.

At block 440, for each candidate content item, the target entity embedding corresponding to that candidate content item, along with the source entity embedding and the one or more segment embeddings are input to an artificial neural network (ANN), such as neural network 200. The ANN may be stored in content delivery exchange 124. The ANN produces an output. For example, for one candidate content item, the source entity embedding is input to branch 210, the target entity embedding is input to branch 220, and the one or more segment embeddings are input to branch 230.

At block 450, based on the output associated with each candidate content item, a subset of the candidate content items is selected. For example, the output of neural network 220 is input to another function (e.g., a logistic regression model) to produce a score representing a prediction of an action (or interaction) that the source entity might perform. The candidate content items associated with the highest scores are selected.

At block 460, the selected candidate content item(s) is/are caused to be presented on a display of a computing device of the source entity. In some cases, a content request may result in selecting a single content item for presentation, while, in other cases, a content request may result in selecting multiple content items for presentation. Block 460 may involve generating a (e.g., HTTP) response that includes the selected content items (or references thereto) and transmitting the response over a computer network to the computing device, such as client device 142.

Missing Embeddings

In some situations, embeddings for target entities and/or source entities are missing. An embedding for an entity may be missing if an embedding has not yet been learned for that entity. For example, no embedding has yet been learned for a new source entity that recently registered with a system affiliated with content delivery system 120. As another example, no embedding has yet been learned for a new content delivery campaign.

In this embodiment, if no embedding exists for a target entity or a source entity, then a random embedding is generated. Alternatively, if the missing embedding is for a new source entity, then embeddings of other source entities that are considered similar (e.g., based on one or more shared characteristics) to the new source entity may be combined (e.g., averaged, median determined, or maximum determined) to generate a combined source entity embedding. The combined source entity embedding is used for the new source entity until a machine-learned embedding is generated for the new source entity.

In some scenarios, a user might not fill in his/her profile with sufficient information, such that one or more attribute values for certain segments are missing. For example, a user might not specify a country in her profile. A geographic location of the user may be inferred by determining a geographic location of any employer identified in the user's profile, determining a geographic location of connections of the user, determining a geographic location of an academic institution identified in the user's profile, and/or determining a geographic location of users who share the same job title as the user.

Scoring in Real Time

In some situations, the number of queries per second for a prediction or score that relies on neural network 200 may be in the hundreds or thousands. Additionally, for each query, neural network 200 may be invoked to score each candidate pair of tens, hundreds, or thousands of source entity-target entity candidate pairs. When scoring a candidate pair, it is best to perform the scoring online, or in response to a query/request in order to provide "fresh" or accurate and up-to-date rankings. However, "deep scoring," or scoring a candidate pair using a neural network is time consuming and, therefore, adds latency.

In an embodiment, portions of a neural network are invoked offline (i.e., not in response to a query/request) to generate and cache certain embeddings. At runtime (or in an online fashion), the pre-generated embeddings are input to other portions of the neural network. For example, once neural network 200 is trained, source entity embeddings corresponding to different source entities are input into branch 210 and, for each source entity embedding, a source branch output embedding is generated from output layer 216 of branch 210. Such an output embedding is cached or stored such that it is quickly available at runtime when the corresponding source entity is the subject of a content request.

As another example, once neural network 200 is trained, target entity embeddings corresponding to different target entities are input into branch 220 and, for each target entity embedding, a target branch output embedding is generated from output layer 226 of branch 220. Such an output embedding is cached or stored such that the output embedding is quickly available at runtime when the corresponding target entity is associated with a candidate content item of a content request.

Similarly, once neural network 200 is trained, a set of one or more segment encodings (e.g., one-hot encodings) corresponding to one or more segments of a source entity is input into branch 230 and, based on that set of segment encodings, a segment branch output embedding is generated from output layer 238 of branch 230. Such an output embedding may reflect multiple segments to which the source entity belongs or is assigned. Such an output embedding is cached or stored such that the output embedding is quickly available at runtime when the corresponding segment is associated with a source entity that is a subject of a content request.

Thus, in response to a content request, once the source entity and target entities are identified (e.g., as a result of a content item selection event), then the identity of the source entity is used to lookup a source entity embedding for the source entity; the identity of each target entity is used to lookup a target entity embedding for the target entity; and the identity of the source entity is used to identify one or more segments and, for each identified segment, a segment embedding for the segment. The source entity embedding is input to the input layer of branch 210, the target entity embedding is input to the input layer of branch 220, and the set of segment encodings is input to the input layer of branch 230. Therefore, for each source entity-target entity candidate pair, only layers 242-260 of neural network 200 would have to be invoked/leveraged at runtime in order to generate a score for the candidate pair. Additionally, values for features 270 and an output generated based on function 280 and those values are computed at runtime.

Cohorts and Random Effects Models

In an embodiment, neural network 200 is used to score candidate content items that will be used as recommendations that are further categorized based on cohorts. A cohort for a source entity is a group of people that share one or more common characteristics or attributes with the source entity and, thus, may have an affinity to the source entity. Example cohorts include fellow alumni (where other users graduated from the same academic institution as the source entity), fellow coworker (where other users currently work or have worked at the same employer at which the source entity currently works or previously worked), fellow member (where other users are part of the same association, group, or non-employer organization as the source entity), and similar job title in the same geographic location/region (where other users have a similar job title as the source entity and are associated with the same geographic location (e.g., city) as the source entity).

One way to obtain cohort-specific scores is to train and leverage a generalized linear mix (GLMix) model that includes a fixed effects (or global) model and multiple random effects models, each random effects model corresponding to a different cohort. The features of the global model and the random effects models may be the same. However, the training data that is used to train one random effects model would be different from the training data that is used to train each other random effects model. For example, a training instance may correspond to no cohort, one cohort, or multiple cohorts. Also, the training data that is used to train each random effects model is a strict subset of the training data that is used to train the global model.

A GLMix model may be formulated in the following manner:

$$y_{ijk} = \sigma(w^T x_{ij} + b).\beta + \sum_k a_k \sigma(W^T z_{ij} + b')$$

$$z_{ij} = \begin{cases} x_{ij}, & i, j \in k \\ 0, & \text{otherwise} \end{cases}$$

where the two terms in the first equation capture non-linearity in the global and random effects models, i refers to the source entity, j refers to the target entity, and k refers to the number of effects in a random effects model.

In an embodiment, neural network 200 is built and trained for only the global model. Alternatively, a separate instance of neural network 200 is built and trained for each of the random effects models. Alternatively still, a separate instance of neural network 200 is built and trained for each of the global model and each of the random effects models.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
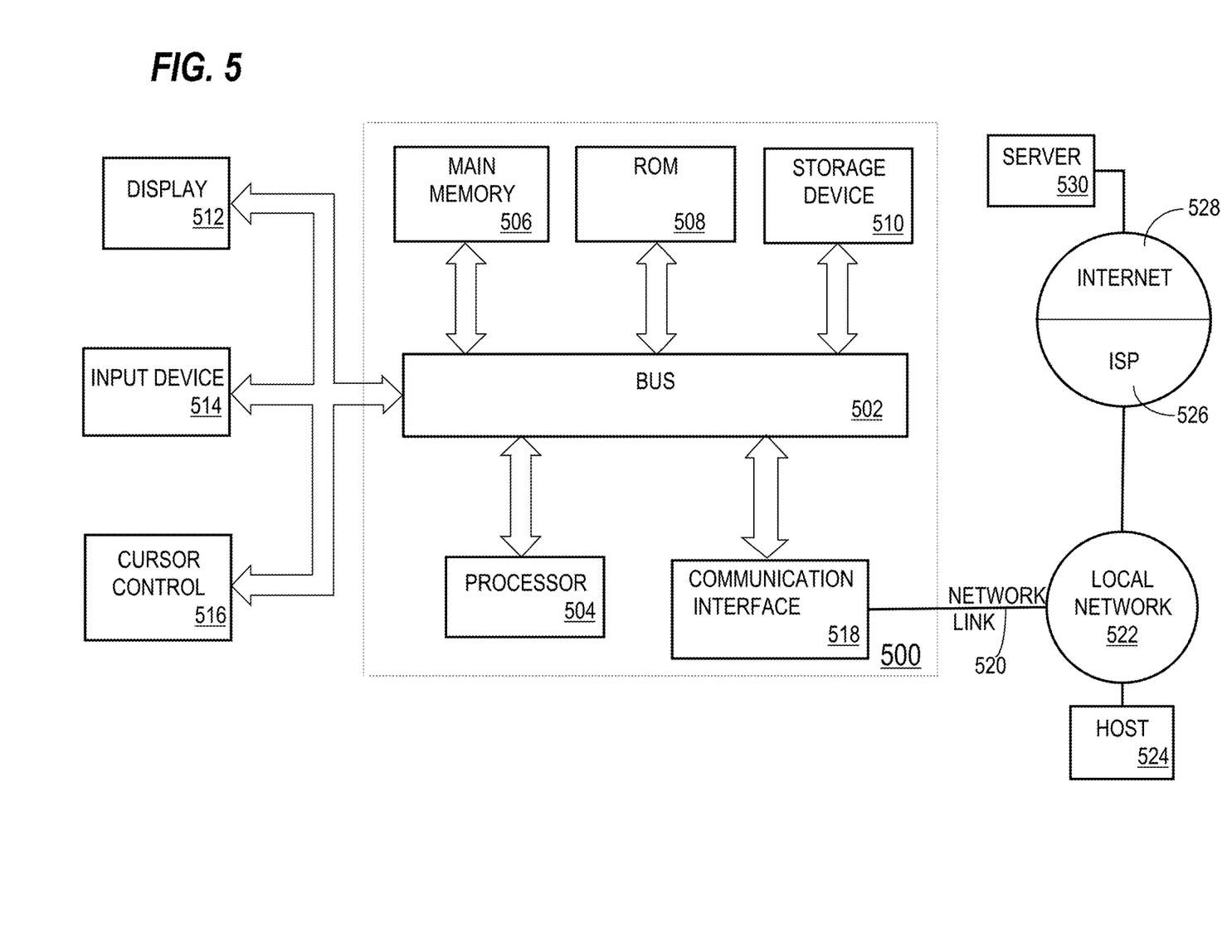
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a content request from a client device;
   identifying a source embedding associated with a user of the client device;
   identifying a segment embedding associated with at least one of an attribute of the user or an online activity of the user;
   identifying a set of content items to possibly display at the client device in response to the content request;
   for at least one content item of the set of content items, identifying a corresponding target embedding;

inputting the target embedding, the source embedding, and the segment embedding into a trained neural network;

the trained neural network comprises a source entity branch that corresponds to source entities, a segment branch that corresponds to segments, a target entity branch that corresponds to target entities, a first connecting layer, and a second connecting layer;

the source entity branch, the segment branch, and the target entity branch each comprise an input layer, at least one hidden layer coupled to the input layer, and an output layer coupled to the at least one hidden layer;

the output layer of the source entity branch is connected to at least one node of the first connecting layer;

the output layer of the segment branch is connected to the at least one node of the first connecting layer;

the output layer of the target entity branch is connected to at least one node of the second connecting layer;

the output layer of the segment branch is connected to the at least one node of the second connecting layer;

the target embedding is input to the input layer of the target entity branch;

the source embedding is input to the input layer of the source entity branch;

the segment embedding is input to the input layer of the segment branch;

based on output of the first connecting layer and the second connecting layer, selecting a content item from the set of content items;

causing the selected content item to be presented at the client device in response to the content request.

2. The method of claim 1, wherein at least one of the segments corresponds to multiple geographies, multiple languages, multiple ranges of connection counts, or multiple online activity levels.

3. The method of claim 1, wherein the source entity branch, the target entity branch, and the segment branch are not fully connected.

4. The method of claim 1, further comprising:
prior to receiving the content request:
for each source entity in a plurality of source entities, identifying a first embedding for the source entity and inserting the first embedding into the source entity branch to generate a source entity embedding for the source entity and storing the source entity embedding in storage;
for each target entity in a plurality of target entities, identifying a second embedding for the target entity and inserting the second embedding into the target entity branch to generate a target entity embedding for the target entity and store the target entity embedding in the storage;
for each segment in a plurality of source entity segments, identifying an encoding for the segment and inserting the encoding into the segment branch to generate a source entity segment embedding for the segment and storing the source entity segment embedding in the storage;
wherein identifying the source embedding comprises retrieving the source embedding from the storage;
wherein identifying the target embedding comprises retrieving the target embedding from the storage; and
wherein identifying the segment embedding comprises retrieving the segment embedding from the storage.

5. The method of claim 1, wherein the output is input to a machine-learned model that comprises a plurality of features, one of which corresponds to neural network output from the trained neural network, and one or more of which corresponds to attributes of a source entity.

6. The method of claim 5, wherein the machine-learned model is a generalized linear mixed model that comprises a global model and a plurality of random effects models.

7. The method of claim 6, wherein each random effects model of the plurality of random effects models corresponds to a different cohort of a plurality of cohorts that includes a cohort based on a common academic institution or a common employer.

8. The method of claim 7, further comprising:
generating a plurality of training instances to train the generalized linear mixed model;
associating each training instance of the plurality of training instances with zero or more of the plurality of random effects models;
wherein a first training instance in the plurality of training instances is associated with only a first random effects model of the plurality of random effects models;
wherein a second training instance in the plurality of training instances is associated with only a second random effects model, of the plurality of random effects models, that is different from the first random effects model;
wherein after the generalized linear mixed model is trained with the plurality of training instances, the first random effects model is trained with the first training instance and not with the second training instance and the second random effects model is trained with the second training instance and not with the first training instance.

9. A system comprising:
one or more processors:
one or more storage media storing instructions which, when executed by the one or more processors, cause:
receiving a content request from a client device;
identifying a source embedding associated with a user of the client device;
identifying a segment embedding associated with at least one of an attribute of the user or an online activity of the user;
identifying a set of content items to possibly display at the client device in response to the content request;
for at least one content item of the set of content items, identifying a corresponding target embedding;
inputting the target embedding, the source embedding, and the segment embedding into a trained neural network;
the trained neural network comprises a source entity branch that corresponds to source entities, a segment branch that corresponds to segments, a target entity branch that corresponds to target entities, a first connecting layer, and a second connecting layer;
the source entity branch, the segment branch, and the target entity branch each comprise an input layer, at least one hidden layer coupled to the input layer, and an output layer coupled to the at least one hidden layer;
the output layer of the source entity branch is connected to at least one node of the first connecting layer;
the output layer of the segment branch is connected to the at least one node of the first connecting layer;
the output layer of the target entity branch is connected to at least one node of the second connecting layer;
the output layer of the segment branch is connected to the at least one node of the second connecting layer;
the target embedding is input to the input layer of the target entity branch;

the source embedding is input to the input layer of the
source entity branch;
the segment embedding is input to the input layer of the
segment branch;
based on output of the first connecting layer and the
second connecting layer, selecting a content item from
the set of content items;
causing the selected content item to be presented at the
client device in response to the content request.

10. The system of claim 9, wherein at least one of the segments corresponds to multiple geographies, multiple languages, multiple ranges of connection counts, or multiple online activity levels.

11. The system of claim 9, wherein the source entity branch, the target entity branch, and the segment branch are not fully connected.

12. The system of claim 9, wherein the instructions, when executed by the one or more processors, further cause:
prior to receiving the content request:
for each source entity in a plurality of source entities, identifying a first embedding for the source entity and inserting the first embedding into the source entity branch to generate a source entity embedding for the source entity and storing the source entity embedding in storage;
for each target entity in a plurality of target entities, identifying a second embedding for the target entity and inserting the second embedding into the target entity branch to generate a target entity embedding for the target entity and store the target entity embedding in the storage;
for each segment in a plurality of source entity segments, identifying an encoding for the segment and inserting the encoding into the segment branch to generate a source entity segment embedding for the segment and storing the source entity segment embedding in the storage;
wherein identifying the source embedding comprises retrieving the source embedding from the storage;
wherein identifying the target embedding comprises retrieving the target embedding from the storage; and
wherein identifying the segment embedding comprises retrieving the segment embedding from the storage.

13. The system of claim 9, wherein the output is input to a machine-learned model that comprises a plurality of features, one of which corresponds to neural network output from the trained neural network, and one or more of which corresponds to attributes of a source entity.

14. The system of claim 13, wherein the machine-learned model is a generalized linear mixed model that comprises a global model and a plurality of random effects models.

15. The system of claim 14, wherein each random effects model of the plurality of random effects models corresponds to a different cohort of a plurality of cohorts that includes a cohort based on a common academic institution or a common employer.

16. The system of claim 14, wherein the instructions, when executed by the one or more processors, further cause:
generating a plurality of training instances to train the generalized linear mixed model;
associating each training instance of the plurality of training instances with zero or more of the plurality of random effects models;
wherein a first training instance in the plurality of training instances is associated with only a first random effects model of the plurality of random effects models;
wherein a second training instance in the plurality of training instances is associated with only a second random effects model, of the plurality of random effects models, that is different from the first random effects model;
wherein after the generalized linear mixed model is trained with the plurality of training instances, the first random effects model is trained with the first training instance and not with the second training instance and the second random effects model is trained with the second training instance and not with the first training instance.

17. One or more storage media storing instructions which, when executed by one or more processors, cause:
receiving a content request from a client device;
identifying a source embedding associated with a user of the client device;
identifying a segment embedding associated with at least one of an attribute of the user or an online activity of the user;
identifying a set of content items to possibly display at the client device in response to the content request;
for at least one content item of the set of content items, identifying a corresponding target embedding;
inputting the target embedding, the source embedding, and the segment embedding into a trained neural network;
the trained neural network comprises a source entity branch that corresponds to source entities, a segment branch that corresponds to segments, a target entity branch that corresponds to target entities, a first connecting layer, and a second connecting layer;
the source entity branch, the segment branch, and the target entity branch each comprise an input layer, at least one hidden layer coupled to the input layer, and an output layer coupled to the at least one hidden layer;
the output layer of the source entity branch is connected to at least one node of the first connecting layer;
the output layer of the segment branch is connected to the at least one node of the first connecting layer;
the output layer of the target entity branch is connected to at least one node of the second connecting layer;
the output layer of the segment branch is connected to the at least one node of the second connecting layer;
the target embedding is input to the input layer of the target entity branch;
the source embedding is input to the input layer of the source entity branch;
the segment embedding is input to the input layer of the segment branch;
based on output of the first connecting layer and the second connecting layer, selecting a content item from the set of content items;
causing the selected content item to be presented at the client device in response to the content request.

18. The one or more storage media of claim 17, wherein at least one of the segments corresponds to multiple geographies, multiple languages, multiple ranges of connection counts, or multiple online activity levels.

19. The one or more storage media of claim 17, wherein the source entity branch, the target entity branch, and the segment branch are not fully connected.

20. The one or more storage media of claim 17, wherein the instructions, when executed by the one or more processors, further cause:
prior to receiving the content request:

for each source entity in a plurality of source entities, identifying a first embedding for the source entity and inserting the first embedding into the source entity branch to generate a source entity embedding for the source entity and storing the source entity embedding in storage;

for each target entity in a plurality of target entities, identifying a second embedding for the target entity and inserting the second embedding into the target entity branch to generate a target entity embedding for the target entity and store the target entity embedding in the storage;

for each segment in a plurality of source entity segments, identifying an encoding for the segment and inserting the encoding into the segment branch to generate a source entity segment embedding for the segment and storing the source entity segment embedding in the storage;

wherein identifying the source embedding comprises retrieving the source embedding from the storage;

wherein identifying the target embedding comprises retrieving the target embedding from the storage; and wherein identifying the segment embedding comprises retrieving the segment embedding from the storage.

* * * * *